(12) United States Patent
Sawyer et al.

(10) Patent No.: US 9,174,886 B2
(45) Date of Patent: Nov. 3, 2015

(54) COATED PARTICLES, METHODS OF MAKING THE SAME, AND METHODS OF USE

(71) Applicant: University of Florida Research Foundation, Inc., Gainesville, FL (US)

(72) Inventors: Wallace Gregory Sawyer, Gainesville, FL (US); Kyle Gene Rowe, Gainesville, FL (US); Alexander Rejender Webber, Gainesville, FL (US)

(73) Assignee: UNIVERSITY OF FLORIDA RESEARCH FOUNDATION, INC., Gainesville, FL (US)

( * ) Notice: Subject to any disclaimer, the term of this patent is extended or adjusted under 35 U.S.C. 154(b) by 74 days.

(21) Appl. No.: 13/950,917

(22) Filed: Jul. 25, 2013

(65) Prior Publication Data

US 2014/0026628 A1 Jan. 30, 2014

Related U.S. Application Data

(60) Provisional application No. 61/677,031, filed on Jul. 30, 2012.

(51) Int. Cl.
*C05G 3/00* (2006.01)
(52) U.S. Cl.
CPC ............ *C05G 3/0088* (2013.01); *C05G 3/0029* (2013.01)

(58) Field of Classification Search
CPC ...... C05G 3/00; C05G 3/0088; C05G 3/0029; C05G 3/0041
See application file for complete search history.

(56) References Cited

U.S. PATENT DOCUMENTS

| 4,383,391 | A  | * | 5/1983  | Thomas et al. ................ 47/57.6 |
| 5,238,480 | A  |   | 8/1993  | Rehberg et al. |
| 5,256,444 | A  |   | 10/1993 | Roe |
| 5,480,584 | A  |   | 1/1996  | Urano et al. |
| 5,639,397 | A  |   | 6/1997  | Roe et al. |
| 6,475,259 | B1 | * | 11/2002 | Thomas et al. ............. 71/64.07 |
| 7,208,023 | B2 |   | 4/2007  | Reeves et al. |
| 7,445,657 | B2 |   | 11/2008 | Green |
| 2007/0004811 | A1 | | 1/2007 | Bruner et al. |
| 2007/0053846 | A1 | | 3/2007 | Dave et al. |
| 2011/0000268 | A1 | | 1/2011 | Schaafsma et al. |
| 2014/0026628 | A1 | * | 1/2014 | Sawyer et al. .................... 71/24 |

OTHER PUBLICATIONS

Rieger, L et al. "Dye-based coatings for hydrophobic values and their application to polymer labs-on-a-chip". 2010 J. Micromech Microeng. 20 045021 pp. 1-6.*

* cited by examiner

*Primary Examiner* — Jennifer A Smith
(74) *Attorney, Agent, or Firm* — Thomas Horstemeyer, LLP

(57) ABSTRACT

Embodiments of the present disclosure provide for coated particles, compositions including coated particles, methods for making coated particles, methods of reducing dust, and the like.

12 Claims, 2 Drawing Sheets uncoated sample 0.05 wt. % coated sample

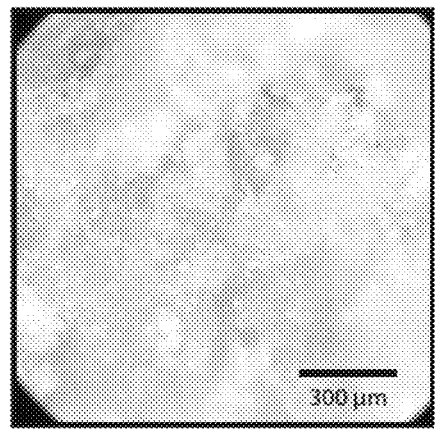
FIG. 1A
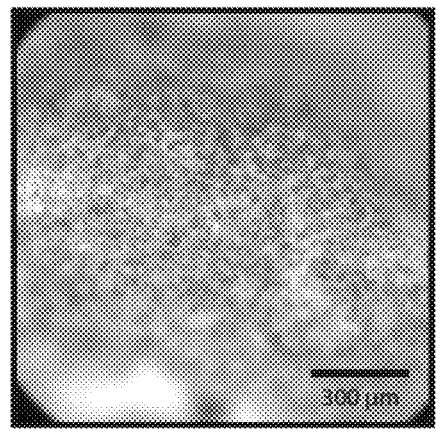
FIG. 1B
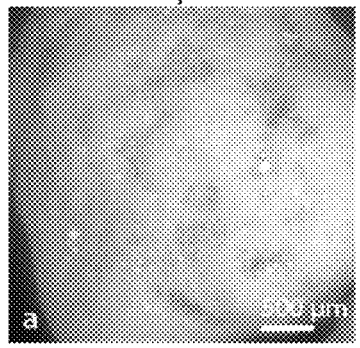
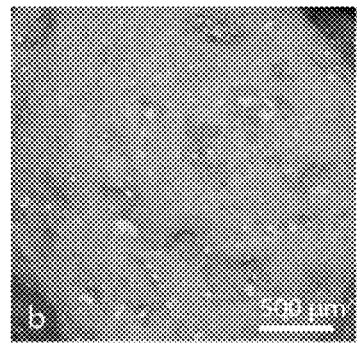
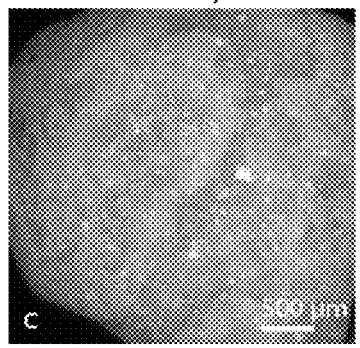
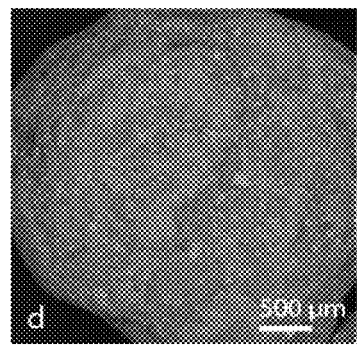
FIG. 2A-2D

US 9,174,886 B2

COATED PARTICLES, METHODS OF MAKING THE SAME, AND METHODS OF USE

CLAIM OF PRIORITY TO RELATED APPLICATION

This application claims priority to U.S. provisional application entitled "COATED PARTICLES, METHODS OF MAKING THE SAME, AND METHODS OF USE" having Ser. No. 61/677,031, filed on Jul. 30, 2012, which is entirely incorporated herein by reference.

BACKGROUND

Granule-to-granule interaction is responsible for a large portion of the airborne particulates created during the handling of granular fertilizers. The airborne particulates can be harmful to breathe and have the potential to combust. Consequentially, generation of the airborne particulates creates a hazardous situation. Thus, there is a need to overcome these problems.

SUMMARY

Embodiments of the present disclosure provide for coated particles, compositions including coated particles, methods for making coated particles, methods of reducing dust, and the like.

In an embodiment, a composition can include a plurality of coated particles, where a coating on the coated particles is a non-liquid based coating that includes amorphous carbon and a fluoropolymer.

In an embodiment, a composition can include plurality of coated fertilizer particles, where a coating on the fertilizer particle is a non-liquid based coating that includes amorphous carbon and PTFE, where the non-liquid based coating is only on the surface of the particles, where the amorphous carbon is selected from the group consisting of: activated carbon, carbon black, charcoal, a combination thereof, and where the non-liquid based coating has a thickness of about 1 nm to 5 µm.

In an embodiment, a method of making a composition including coated particles can include: mixing a dry coating with a plurality of particles, where the dry coating is a non-liquid based coating that includes amorphous carbon and a fluoropolymer; and forming a plurality of coated particles.

Other coated particles, compositions, methods, features, and advantages will be, or become, apparent to one with skill in the art upon examination of the following drawings and detailed description. It is intended that all such additional structures, systems, methods, features, and advantages be included within this description, be within the scope of the present disclosure, and be protected by the accompanying claims.

BRIEF DESCRIPTION OF THE DRAWINGS

Many aspects of this disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 1A and 1B illustrate two micrographs of uncoated and coated granular fertilizer.

FIGS. 2A to 2D illustrate scanning electron microscope images of (a, b) coated and (c, d) uncoated samples with elemental map overlays (b, d) depicting coating coverage through the presence of fluorine; an elemental constituent of PTFE.

DETAILED DESCRIPTION

Figure 3:
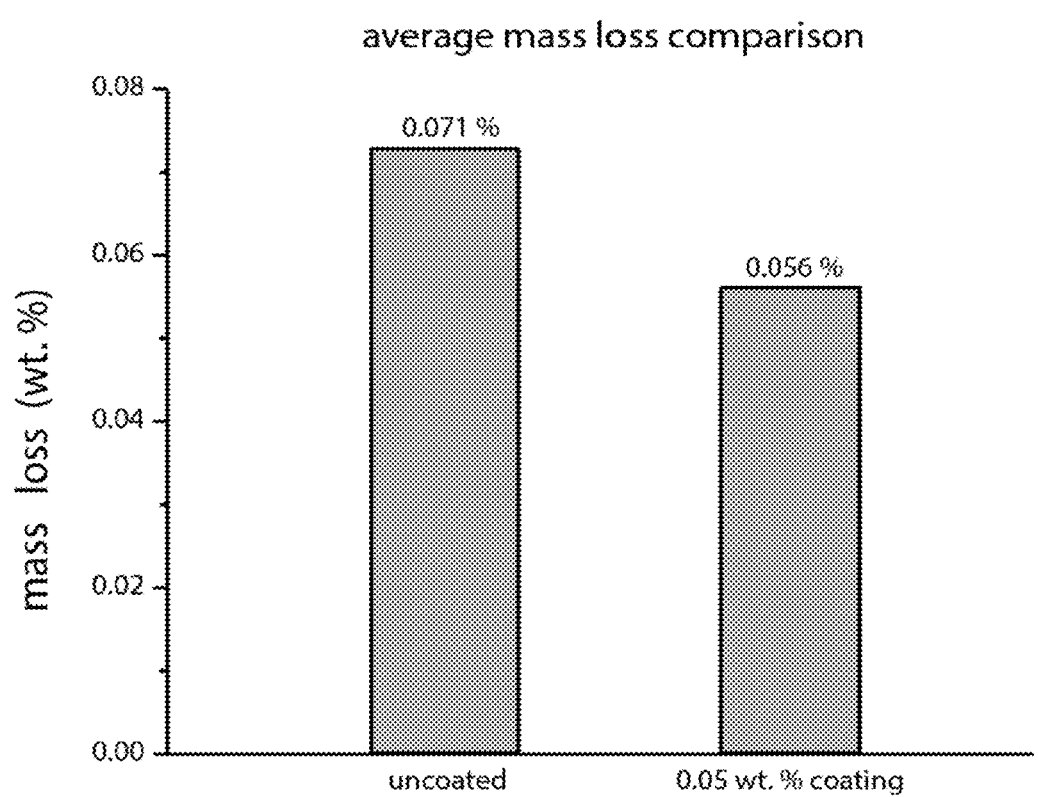
FIG. 3 illustrates a graph that illustrates the reduction in mass lose between uncoated and coated granular fertilizer.

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims. Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed. Terms defined in references that are incorporated by reference do not alter definitions of terms defined in the present disclosure or should such terms be used to define terms in the present disclosure they should only be used in a manner that is inconsistent with the present disclosure.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, physics, and the like, which are within the skill of the art. Such techniques are explained fully in the literature. Certain of the measurements discussed herein are carried out in accordance with recognized protocols specified by ASTM Standards, which are promulgated by ASTM International, West Conshohocken, Pa. Each such standard referenced herein is incorporated in its entirety by reference.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is in atmosphere. Standard temperature and pressure are defined as 25° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Discussion

Embodiments of the present disclosure provide for coated particles, compositions including coated particles, methods for making coated particles, methods of reducing dust, and the like. Embodiments of the present disclosure relate to coating particles that can reduce dust production and dissemination. Embodiments of the present disclosure include coated particles having a coating layer made of a fluoropolymer and amorphous carbon.

As mentioned above, granule-to-granule interactions are responsible for a large portion of the airborne particulate created during the handling of granular particles such as fertilizers, and the airborne debris from granular fertilizer can be hazardous. By reducing dust, less product is lost, product appearance is improved, and the risks associated with airborne fertilizer dust are reduced. In addition to reducing dust the coating layer can act as a solid lubricant that could potentially reduce wear on the equipment used to handle coated products both at the factory and at the end use point.

In an embodiment, the use of a dry coating (coating layer) on the particles (coated particles) to reduce friction between particles can minimize the dust generated by the particle-particle interactions as well as reduce wear on the equipment used to handle the coated particles. In an embodiment, the coating layer is external and does not absorb into the particles so as not to affect the function of the particle. The coating itself has minimal transfer to its surroundings. In an embodiment, the coating can reduce the amount of particulate, with an equivalent diameter equal to or less than 180 µm that is generated by particle to particle collisions by up to 25% over uncoated granules. In an embodiment, use of the coating can reduce mass loss due to granule-to-granule interactions by up to 75%. Additional details are provided in the Example.

Previously all coatings were liquid based and would require multiple applications during the granule lifetime. The liquid based coating can be absorbed by the particles, which can alter the performance of the particles. As described herein, dry coating could open up the possibility of non-liquid based coatings that would only need one application.

In an embodiment, the coated particles can be produced by dry coating the particles, which can be accomplished by mixing the components of the coating layer with particles. In an embodiment, the components can be premixed prior to mixing with the particles. In an embodiment, the components can be mixed together with the particles simultaneously or sequentially in any order.

In an embodiment, the particles can include those that are produced in the industries such as the transportation and handling of agricultural products, mining, mineral production, paper, steel, and the like. In particular, the particles can include those in the agricultural area, such as fertilizer particles. In an embodiment, the particles can be about 10 nm to 100 cm or larger. In an embodiment, the particles can be about 10 nm to 200 µm. In an embodiment, the particles can be an aggregate of a plurality of particles.

In an embodiment, the coating on the coated particles can cover about 5% to 100% of the surface of the particle. In an embodiment, the coating material is not distributed throughout the particle, rather the coating layer is on the surface of the particle. In an embodiment, the coating material may be disposed in pores or crevices or contours on the surface of the particle, but the coating material is not absorbed by the particle and distributed throughout the particle. In an embodiment, the coating layer can be a few nanometers thick to a few micrometers thick (e.g., about 1 nm to 5 µm, and any increments of about 1 nm from about 1 nm to 5 µm). In an embodiment, the coating layer thickness is uniform and in other embodiments the coating layer is non-uniform. In an embodiment, the thickness and/or uniformity can be controlled to produce a desired result. In an embodiment, the ratio of the amorphous carbon to fluoropolymer can be about 1:99 to 99:1, about 20:80 to 80:20, about 35:65 to 65:35 or about 50:50. In an embodiment, a composition can include coated and uncoated particles. In an embodiment, the coated particles in a composition can have various degrees of coating layer coverage.

Amorphous carbon is less ordered at the microscopic scale than crystalline graphite that includes a hexagonal or rhombohedral crystal structure. In an addition, amorphous carbon tends to be more reactive than graphite. In an embodiment, amorphous carbon can include activated carbon, carbon black, charcoal, a combination thereof, and the like.

Fluoropolymers are used herein to prepare a coating composition by admixture with amorphous carbon. For that purpose an individual fluoropolymer can be used alone; mixtures or blends of two or more different kinds of fluoropolymers can be used as well. Fluoropolymers useful in the practice of this disclosure are prepared from at least one unsaturated fluorinated monomer (fluoromonomer). A fluoromonomer suitable for use herein preferably contains about 35 wt % or more fluorine, and preferably about 50 wt % or more fluorine, and can be an olefinic monomer with at least one fluorine or fluoroalkyl group or fluoroalkoxy group attached to a doubly-bonded carbon. In one embodiment, a fluoromonomer suitable for use herein is tetrafluoroethylene (TFE).

An especially useful fluoropolymer is polytetrafluoroethylene (PTFE), which refers to (a) polymerized tetrafluoroethylene by itself without any significant comonomer present, i.e. a homopolymer of TFE, and (b) modified PTFE, which is a copolymer of TFE with such small concentrations of comonomer that the melting point of the resultant polymer is not substantially reduced below that of PTFE (reduced, for example, by about 8% or less, about 4% or less, about 2% or less, or about 1% or less). Modified PTFE contains a small amount of comonomer modifier that improves film forming capability during baking (fusing). Comonomers useful for such purpose typically are those that introduce bulky side groups into the molecule, and specific examples of such monomers are described below. The concentration of such comonomer is preferably less than 1 wt %, and more preferably less than 0.5 wt %, based on the total weight of the TFE and comonomer present in the PTFE. A minimum amount of at least about 0.05 wt % comonomer is preferably used to have a significant beneficial effect on processability. The presence of the comonomer is believed to cause a lowering of the average molecular weight.

PTFE (and modified PTFE) typically have a melt creep viscosity of at least about $1 \times 10^6$ Pa·s and preferably at least about $1 \times 10^8$ Pa·s. With such high melt viscosity, the polymer does not flow in the molten state and therefore is not a melt-processable polymer. The measurement of melt creep viscosity is disclosed in col. 4 of U.S. Pat. No. 7,763,680. The high melt viscosity of PTFE arises from its extremely high molecular weight (Mn), e.g., at least about $10^6$. Additional indicia of this high molecular weight include the high melting temperature of PTFE, which is at least 330° C., usually at least 331° C. and most often at least 332° C. (all measured on first heat). The non-melt flowability of the PTFE, arising from its extremely high melt viscosity, manifests itself as a melt flow rate (MFR) of 0 when measured in accordance with ASTM D 1238-10 at 372° C. and using a 5 kg weight. This high melt viscosity also leads to a much lower heat of fusion obtained for the second heat (e.g., up to 55 J/g) as compared to the first heat (e.g., at least 75 J/g) to melt the PTFE, representing a difference of at least 20 J/g. The high melt viscosity of the PTFE reduces the ability of the molten PTFE to recrystallize upon cooling from the first heating. The high melt viscosity of PTFE enables its standard specific gravity (SSG) to be measured, which measurement procedure (ASTM D 4894-07, also described in U.S. Pat. No. 4,036,802) includes sintering the SSG sample free standing (without containment) above its melting temperature without change in dimension of the SSG sample. The SSG sample does not flow during the sintering.

Low molecular weight PTFE is commonly known as PTFE micropowder, which distinguishes it from the PTFE described above. The molecular weight of PTFE micropowder is low relative to PTFE, i.e. the molecular weight (Mn) is generally in the range of $10^4$ to $10^5$. The result of this lower molecular weight of PTFE micropowder is that it has fluidity in the molten state, in contrast to PTFE which is not melt flowable. The melt flowability of PTFE micropowder can be characterized by a melt flow rate (MFR) of at least about 0.01 g/10 min, preferably at least about 0.1 g/10 min, more preferably at least about 5 g/10 min, and still more preferably at least about 10 g/10 min., as measured in accordance with ASTM D 1238-10, at 372° C. using a 5 kg weight on the molten polymer.

In other embodiments, a fluoromonomer suitable for use herein, by itself to prepare a homopolymer or in copolymerization with other comonomers such as TFE, can be represented by the structure of the following Formula I:

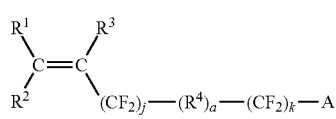

I wherein $R^1$ and $R^2$ are each independently selected from H, F and Cl;

$R^3$ is H, F, or a $C_1$~$C_{12}$, or $C_1$~$C_8$, or $C_1$~$C_6$, or $C_1$~$C_4$ straight-chain or branched, or a $C_3$~$C_{12}$, or $C_3$~$C_8$, or $C_3$~$C_6$ cyclic, substituted or unsubstituted, alkyl radical; $R^4$ is a $C_1$~$C_{12}$, or $C_1$~$C_8$, or $C_1$~$C_6$, or $C_1$~$C_4$ straight-chain or branched, or a $C_3$~$C_{12}$, or $C_3$~$C_8$, or $C_3$~$C_6$ cyclic, substituted or unsubstituted, alkylene radical; A is H, F or a functional group; a is 0 or 1; and j and k are each independently 0 to 10; provided that, when a, j and k are all 0, at least one of $R^1$, $R^2$, $R^3$ and A is not F.

An unsubstituted alkyl or alkylene radical as described above contains no atoms other than carbon and hydrogen. In a substituted hydrocarbyl radical, one or more halogens selected from Cl and F can be optionally substituted for one or more hydrogens; and/or one or more heteroatoms selected from O, N, S and P can optionally be substituted for any one or more of the in-chain (i.e. non-terminal) or in-ring carbon atoms, provided that each heteroatom is separated from the next closest heteroatom by at least one and preferably two carbon atoms, and that no carbon atom is bonded to more than one heteroatom. In other embodiments, at least 20%, or at least 40%, or at least 60%, or at least 80% of the replaceable hydrogen atoms are replaced by fluorine atoms. Preferably a Formula I fluoromonomer is perfluorinated, i.e. all replaceable hydrogen atoms are replaced by fluorine atoms.

In a Formula I compound, a linear $R^3$ radical can, for example, be a $C_b$ radical where b is 1, 2, 3, 4, 5, 6, 7, 8, 9, 10, 11 or 12 and the radical can contain from 1 up to 2b+1 fluorine atoms. For example, a $C_4$ radical can contain from 1 to 9 fluorine atoms. A linear $R^3$ radical is perfluorinated with 2b+1 fluorine atoms, but a branched or cyclic radical will be perfluorinated with fewer than 2b+1 fluorine atoms. In a Formula I compound, a linear $R^4$ radical can, for example, be a $C_c$ radical where c is 1, 2, 3, 4, 5, 6, 7, 8, 9, 10, 11 or 12 and the radical can contain from 1 to 2c fluorine atoms. For example, a $C_6$ radical can contain from 1 to 12 fluorine atoms. A linear $R^4$ radical is perfluorinated with 2c fluorine atoms, but a branched or cyclic radical will be perfluorinated with fewer than 2c fluorine atoms.

Examples of a $C_1$~$C_{12}$ straight-chain or branched, substituted or unsubstituted, alkyl or alkylene radical suitable for use herein can include or be derived from a methyl, ethyl, n-propyl, i-propyl, n-butyl, sec-butyl, tert-butyl, n-pentyl, n-hexyl, n-octyl, trimethylpentyl, allyl and propargyl radical. Examples of a $C_3$~$C_{12}$ cyclic aliphatic, substituted or unsubstituted, alkyl or alkylene radical suitable for use herein can include or be derived from an alicyclic functional group containing in its structure, as a skeleton, cyclohexane, cyclooctane, norbornane, norbornene, perhydro-anthracene, adamantane, or tricyclo-[5.2.1.0$^{2.6}$]-decane groups.

Functional groups suitable for use herein as the A substituent in Formula I include ester, alcohol, acid (including carbon-, sulfur-, and phosphorus-based acid) groups, and the salts and halides of such groups; and cyanate, carbamate, and nitrile groups. Specific functional groups that can be used include —SO$_2$F, —CN, —COOH—, and —CH$_2$—Z wherein —Z is —OH, —OCN, —O—(CO)—NH$_2$, or —OP(O)(OH)$_2$.

Formula I fluoromonomers that can be homopolymerized include vinyl fluoride (VF), to prepare polyvinyl fluoride (PVF), and vinylidene fluoride (VF$_2$) to prepare polyvinylidene fluoride (PVDF), and chlorotrifluoroethylene to prepare polychlorotrifluoroethylene. Examples of Formula I fluoromonomers suitable for copolymerization include those in a group such as ethylene, propylene, 1-butene, 1-hexene, 1-octene, chlorotrifluoroethylene (CTFE), trifluoroethylene, hexafluoroisobutylene, vinyl fluoride (VF), vinylidene fluoride (VF$_2$), and perfluoroolefins such as hexafluoropropylene (HFP), and perfluoroalkyl ethylenes such as perfluoro(butyl)

ethylene (PFBE). A preferred monomer for copolymerization with any of the above named comonomers is tetrafluoroethylene (TFE).

In yet other embodiments, a fluoromonomer suitable for use herein, by itself to prepare a homopolymer or in copolymerization with TFE and/or any of the other comonomers described above, can be represented by the structure of the following Formula II:

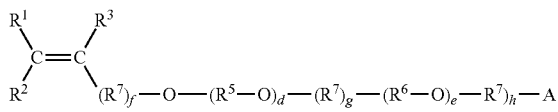

II wherein $R^1$ through $R^3$ and A are each as set forth above with respect to Formula I; d and e are each independently 0 to 10; f, g and h are each independently 0 or 1; and $R^5$ through $R^7$ are the same radicals as described above with respect to $R^4$ in Formula I except that when d and e are both non-zero and g is zero, $R^5$ and $R^6$ are different $R^4$ radicals.

Formula II compounds introduce ether functionality into fluoropolymers suitable for use herein, and include fluorovinyl ethers such as those represented by the following formula: $CF_2=CF-(O-CF_2CFR^{11})_h-O-CF_2CFR^{12}SO_2F$, wherein $R^{11}$ and $R^{12}$ are each independently selected from F, Cl or a perfluorinated alkyl group having 1 to 10 carbon atoms, and h=0, 1 or 2. Examples of polymers of this type that are disclosed in U.S. Pat. No. 3,282,875 include $CF_2=CF-O-CF_2CF(CF_3)-O-CF_2CF_2SO_2F$ and perfluoro(3,6-dioxa-4-methyl-7-octenesulfonyl fluoride), and examples that are disclosed in U.S. Pat. Nos. 4,358,545 and 4,940,525 include $CF_2=CF-O-CF_2CF_2SO_2F$. Another example of a Formula II compound is $CF_2=CF-O-CF_2-CF(CF_3)-O-CF_2CF_2CO_2CH_3$, the methyl ester of perfluoro(4,7-dioxa-5-methyl-8-nonenecarboxylic acid), as disclosed in U.S. Pat. No. 4,552,631. Similar fluorovinyl ethers with functionality of nitrile, cyanate, carbamate, and phosphonic acid are disclosed in U.S. Pat. Nos. 5,637,748, 6,300,445 and 6,177,196. Methods for making fluoroethers suitable for use herein are set forth in the U.S. patents listed above in this paragraph, and each of the U.S. patents listed above in this paragraph is by this reference incorporated in its entirety as a part hereof for all purposes.

Particular Formula II compounds suitable for use herein as a comonomer include fluorovinyl ethers such as perfluoro (allyl vinyl ether) and perfluoro(butenyl vinyl ether). Preferred fluorovinyl ethers include perfluoro(alkyl vinyl ethers) (PAVE), where the alkyl group contains 1 to 5 carbon atoms, with perfluoro(ethyl vinyl ether) (PEVE) and perfluoro(propyl vinyl ether) (PPVE), and perfluoro(methyl vinyl ether) (PMVE) being preferred. The structures of these preferred fluorovinyl ethers are respectively depicted by FIGS. 1A-1C.

In yet other embodiments, a fluoromonomer suitable for use herein, by itself to prepare a homopolymer or in copolymerization with TFE and/or any of the other comonomers described above, can be represented by the structure of the following Formula III:

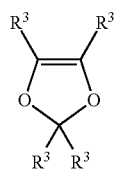

III wherein each $R^3$ is independently as described above in relation to Formula I. Suitable Formula III monomers include perfluoro-2,2-dimethyl-1,3-dioxole (PDD).

In yet other embodiments, a fluoromonomer suitable for use herein, by itself to prepare a homopolymer or in copolymerization with TFE and/or any of the other comonomers described above, can be represented by the structure of the following Formula IV:

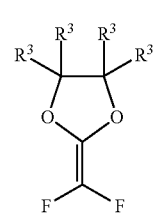

IV wherein each $R^3$ is independently as described above in relation to Formula I. Suitable Formula IV monomers include perfluoro-2-methylene-4-methyl-1,3-dioxolane (PMD).

In various embodiments, fluoropolymer copolymers suitable for use herein can be prepared from any two, three, four or five of these monomers: TFE and a Formula I, II, III and IV monomer. The following are thus representative combinations that are available: TFE/Formula I; TFE/Formula II; TFE/Formula III; TFE/Formula IV; TFE/Formula I/Formula II; TFE/Formula I/Formula III; TFE/Formula I/Formula IV; Formula I/Formula II; Formula I/Formula III; and Formula I/Formula IV. Provided that at least two of the five kinds of monomers are used, a unit derived from each monomer can be present in the final copolymer in an amount of at least about 1 wt %, or at least about 5 wt %, or at least about 10 wt %, or at least about 15 wt %, or at least about 20 wt %, and yet no more than about 99 wt %, or no more than about 95 wt %, or no more than about 90 wt %, or no more than about 85 wt %, or no more than about 80 wt % (based on the weight of the final copolymer); with the balance being made up of one, two, three or all of the other five kinds of monomers.

A fluoropolymer as used herein can also be a mixture of two or more of the homo- and/or copolymers described above, which is usually achieved by dry blending. A fluoropolymer as used herein can also, however, be a polymer alloy prepared from two or more of the homo- and/or copolymers described above, which can be achieved by melt kneading the polymer together such that there is mutual dissolution of the polymer, chemical bonding between the polymers, or dispersion of domains of one of the polymers in a matrix of the other.

Tetrafluoroethylene polymers suitable for use herein can be produced by aqueous polymerization (as described in U.S. Pat. No. 3,635,926) or polymerization in a perhalogenated solvent (U.S. Pat. No. 3,642,742) or hybrid processes involving both aqueous and perhalogenated phases (U.S. Pat. No. 4,499,249). Free radical polymerization initiators and chain transfer agents are used in these polymerizations and have been widely discussed in the literature. For example, persulfate initiators and alkane chain transfer agents are described for aqueous polymerization of TFE/PAVE copolymers. Fluorinated peroxide initiators and alcohols, halogenated alkanes, and fluorinated alcohols are described for nonaqueous or aqueous/nonaqueous hybrid polymerizations.

Various fluoropolymers suitable for use herein include those that are thermoplastic, which are fluoropolymers that, at room temperature, are below their glass transition temperature (if amorphous), or below their melting point (if semicrystalline), and that become soft when heated and become rigid again when cooled without the occurrence of any appreciable chemical change. A semi-crystalline thermoplastic fluoropolymer can have a heat of fusion of at least about 1 J/g, or at least about 4 J/g, or at least about 8 J/g, when measured by Differential Scanning Calorimetry (DSC) at a heating rate of 10° C./min (according to ASTM D 3418-08). Various fluoropolymers suitable for use herein can additionally or alternatively be characterized as melt-processable, and melt-processible fluoropolymers can also be melt-fabricable. A melt-processible fluoropolymer can be processed in the molten state, i.e. fabricated from the melt using conventional processing equipment such as extruders and injection molding machines, into shaped articles such as films, fibers and tubes. A melt-fabricable fluoropolymer can be used to produce fabricated articles that exhibit sufficient strength and toughness to be useful for their intended purpose despite having been processed in the molten state. This useful strength is often indicated by a lack of brittleness in the fabricated article, and/or an MIT Flex Life of at least about 1000 cycles, or at least about 2000 cycles (measured as described above), for the fluoropolymer itself.

Examples of thermoplastic, melt-processible and/or melt-fabricable fluoropolymers include copolymers of tetrafluoroethylene (TFE) and at least one fluorinated copolymerizable monomer (comonomer) present in the polymer in sufficient amount to reduce the melting point of the copolymer below that of PTFE, e.g., to a melting temperature no greater than 315° C. Such a TFE copolymer typically incorporates an amount of comonomer into the copolymer in order to provide a copolymer which has a melt flow rate (MFR) of at least about 1, or at least about 5, or at least about 10, or at least about 20, or at least about 30, and yet no more than about 100, or no more than about 90, or no more than about 80, or no more than about 70, or no more than about 60, as measured according to ASTM D-1238-10 using a weight on the molten polymer and melt temperature which is standard for the specific copolymer. Preferably, the melt viscosity is at least about $10^2$ Pa·s, more preferably, will range from about $10^2$ Pa·s to about $10^6$ Pa·s, most preferably about $10^3$ to about $10^5$ Pa·s. Melt viscosity in Pa·s is 531,700/MFR in g/10 min.

In general, thermoplastic, melt-processible and/or melt-fabricable fluoropolymers as used herein include copolymers that contain at least about 40 mol %, or at least about 45 mol %, or at least about 50 mol %, or at least about 55 mol %, or at least about 60 mol %, and yet no more than about 99 mol %, or no more than about 90 mol %, or no more than about 85 mol %, or no more than about 80 mol %, or no more than about 75 mol % TFE; and at least about 1 mol %, or at least about 5 mol %, or at least about 10 mol %, or at least about 15 mol %, or at least about 20 mol %, and yet no more than about 60 mol %, or no more than about 55 mol %, or no more than about 50 mol %, or no more than about 45 mol %, or no more than about 40 mol % of at least one other monomer. Suitable comonomers to polymerize with TFE to form melt-processible fluoropolymers include a Formula I, II, III and/or IV compound; and, in particular, a perfluoroolefin having 3 to 8 carbon atoms [such as hexafluoropropylene (HFP)], and/or perfluoro(alkyl vinyl ethers) (PAVE) in which the linear or branched alkyl group contains 1 to 5 carbon atoms. Preferred PAVE monomers are those in which the alkyl group contains 1, 2, 3 or 4 carbon atoms, and the copolymer can be made using several PAVE monomers. Preferred TFE copolymers include FEP (TFE/HFP copolymer), PFA (TFE/PAVE copolymer), TFE/HFP/PAVE wherein PAVE is PEVE and/or PPVE, MFA (TFE/PMVE/PAVE wherein the alkyl group of PAVE has at least two carbon atoms) and THV (TFE/HFP/VF$_2$). Additional melt-processible fluoropolymers are the copolymers of ethylene (E) or propylene (P) with TFE or chlorinated TFE (CTFE), notably ETFE, ECTFE and PCTFE. Also useful in the same manner are film-forming polymers of polyvinylidene fluoride (PVDF) and copolymers of vinylidene fluoride as well as polyvinyl fluoride (PVF) and copolymers of vinyl fluoride.

EXAMPLES

Now having described the embodiments of the present disclosure, in general, the following Examples describe some additional embodiments of the present disclosure. While embodiments of present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure.

Experimental Procedure

Granules are placed in a plastic container for mixing and a record of the total particle mass is taken. A specified amount of coating mixture (on a mass basis, e.g., 0.05 wt. % of the total particle mass) is poured onto the granules. The container is closed and mechanically rotated to induce granule to granule interactions. After a standardized mixing time the contents of the container are poured over a fine mesh sieve to remove debris smaller than about 100 μm in diameter (which would be considered dust). The remaining material is then weighed. The difference between the initial coated mass and the final worn mass is taken as the total mass loss of the sample.

Discussion

As granules flow and interact with each other there are several sources of energy dissipation, such as inelastic collisions and frictional interactions caused by shear. This coating can serve two purposes; (1) to reduce the inter-particle friction coefficient and/or (2) to assist in agglomerating cleaved particles, either, together to form larger particles which may not become airborne or to keep them on the surface of larger granules.

As more energy is input into the system (and therefore more granule to granule interactions occur) the more the coating is spread over the surface of the granules. PTFE fibrils are stretched over the surface, by periodic shear events caused by contacting granule surfaces, forming a protective network. This effectively reduces the inter-particle friction coefficient to that of PTFE on PTFE which can be an order of magnitude less than granule on granule.

When coated with a 0.05 wt. % mixture of amorphous carbon and PTFE the reduction in mass loss was between 25% and 75% depending on the granular material tested. For materials which already exhibited a low mass loss the reduction was only about 25% while materials with an initially high mass loss experienced reductions of up to 75%. Several factors can affect the uncoated mass loss such as granule shape and surface roughness. Smooth spherical granules showed a lower propensity for generating dust caused by mechanical mixing whereas irregular rough granules had a much higher uncoated mass loss.

The following Table shows the mass loss is calculated from the difference between the original sample mass and the final sample mass divided by the original sample mass.

| Baseline | Mass Loss % | | PTFE 7C/CarbonBlack | Average Reduction |
|---|---|---|---|---|
| Granular Material A | | | | |
| 1 | 0.064 | 1 | 0.046 | |
| 2 | 0.078 | 2 | 0.056 | 26.60% |
| 3 | 0.08 | 3 | 0.054 | |

-continued

|   | | | | |
|---|---|---|---|---|
| 4 | 0.07 | 4 | 0.056 | |
| Average | 0.073 | 5 | 0.056 | |
| | | Average | 0.0536 | |

Granular Material B

|   | | | | |
|---|---|---|---|---|
| 1 | 0.46 | 1 | 0.11 | |
| 2 | 0.36 | 2 | 0.13 | 68.70% |
| 3 | 0.36 | 3 | 0.13 | |
| Average | 0.393333 | Average | 0.123333 | |

Granular Material A with alternate PTFE source

|   | | NanoFlon/CarbonBlack | Average Reduction |
|---|---|---|---|
| Average | 0.073 | 1 | 0.05 | |
| | | 2 | 0.06 | 27.40% |
| | | 3 | 0.05 | |
| | | Average | 0.053333 | |

It should be noted that some ratios, concentrations, amounts, and other numerical data are expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to measurement technique and/or the numerical value. In addition, the phrase "about 'x' to 'y'" includes "about 'x' to about 'y'".

Many variations and modifications may be made to the above-described embodiments. All such modifications and variations are intended to be included herein within the scope of this disclosure and protected by the following claims.

At least the following is claimed:

1. A composition, comprising:
a plurality of coated fertilizer particles, wherein a coating on the fertilizer particle is a non-liquid based coating that includes amorphous carbon and polytetrafluoroethylene (PTFE), wherein the non-liquid based coating is only on the surface of the particles, wherein the amorphous carbon is selected from the group consisting of: activated carbon, carbon black, charcoal, a combination thereof, and wherein the non-liquid based coating has a thickness of about 1 nm to 5 μm.

2. A composition, comprising:
a coated fertilizer particle, wherein a coating on the coated fertilizer particle is a non-liquid based coating that includes an amorphous carbon and polytetrafluoroethylene (PTFE).

3. The composition of claim 2, wherein the coating covers about 5% to 100% of the surface of the particle and is only on the surface of the particle.

4. The composition of claim 2, wherein the ratio of the amorphous carbon to fluoropolymer is about 20:80 to 80:20.

5. The composition of claim 2, wherein the particle has a diameter of about 10 nm to 200 μm.

6. The composition of claim 1, wherein the coating covers about 5% to 100% of the surface of the particle and is only on the surface of the particles.

7. The composition of claim 1, wherein the ratio of the amorphous carbon to PTFE is about 20:80 to 80:20.

8. The composition of claim 1, wherein the particle has a diameter of about 10 nm to 10 cm.

9. The composition of claim 2, wherein the non-liquid based coating has a thickness of about 1 nm to 5 μm.

10. The composition of claim 2, wherein the particle has a diameter of about 10 nm to 100 cm.

11. The composition of claim 2, wherein the amorphous carbon is selected from the group consisting of: activated carbon, carbon black, charcoal, a combination thereof.

12. The composition of claim 1, wherein the particle has a diameter of about 10 nm to 100 cm.

\* \* \* \* \*